United States Patent [19] [11] 3,710,235
Barrager et al. [45] Jan. 9, 1973

[54] METHOD AND APPARATUS FOR TESTING BATCH FABRICATED MAGNETIC HEADS DURING MANUFACTURE UTILIZING A MAGNETIC FIELD GENERATED BY A CURRENT CARRYING CONDUCTOR

[75] Inventors: Stephen M. Barrager, Palo Alto, Calif.; Sidney H. Smith, Broomfield, Colo.

[73] Assignee: International Business Machines Corporation, Armonk, N.Y.

[22] Filed: June 4, 1971

[21] Appl. No.: 149,975

[52] U.S. Cl. ....................324/34 R, 29/593, 29/603, 179/100.2 B
[51] Int. Cl. ....................G01r 35/00
[58] Field of Search...............324/34 R; 29/593, 603; 179/100.2 B

[56] References Cited

UNITED STATES PATENTS 3,375,439 3/1968 Yamamoto ........................324/34 R
3,417,465 12/1968 Glass..............................324/34 R X
3,564,521 2/1971 Trimble et al. .........................29/603

OTHER PUBLICATIONS

Frese, S. J.; Inductive Tape Synthesizer For R–W Head Testing; IBM Tech. Bull., January 1969; Vol. 11; No. 8 pp. 1043–1044

*Primary Examiner*—Robert J. Corcoran
*Attorney*—Hanifin & Jancin and Gunter A. Hauptman

[57] ABSTRACT

Magnetic head elements are batch fabricated on areas of a substrate. During manufacture, and before final separation and processing of the areas into discrete multi-track magnetic heads, defective areas are identified for removal. An electric signal source subjects the head areas to a magnetic field which is detected as electric current in each head area. The detected current value in acceptable head areas falls within a predefined range. All head areas having a current outside the range are defined as defective. The magnetic field emanates from a conductive strip placed in the vicinity of the head areas being tested.

10 Claims, 20 Drawing Figures

METHOD AND APPARATUS FOR TESTING BATCH FABRICATED MAGNETIC HEADS DURING MANUFACTURE UTILIZING A MAGNETIC FIELD GENERATED BY A CURRENT CARRYING CONDUCTOR

CROSS-REFERENCES

Ser. No. 149,974, "Skewed High Density Magnetic Head and Method of Manufacturing Same," by G. Taylor, describes a head disclosed herein.

Ser. No. 149,973, "Method of Forming Gaps for Small Magnetic Heads," by G. W. Brock and R. Stephens, describes a method of manufacturing a head disclosed herein.

Ser. No. 149,976, "Improved Batch Fabricated Magnetic Head Tester and Testing Method," by S. M. Barrager, G. Bate, and S. H. Smith, describes an improved tester and testing method.

BACKGROUND OF THE INVENTION

1. Field of the Invention

The invention generally relates to electronic data processing and, more particularly, to testing electronic components during manufacture.

2. Description of the Prior Art

Relatively inexpensive fabrication of high precision magnetic heads used for high density recording of information on tapes, disks, drums, etc., has become possible using batch-fabrication techniques. Typically, a foil sheet is cut to form a plurality of head elements, or an insulator acts as a substrate for successive layers of magnetic, conductive, and insulating materials. In the latter technique, complex patterns are formed by deposition, evaporation, masking, etching, bonding, etc. For example, a plurality of head elements has been formed on a single substrate by applying a magnetic layer to the substrate, a conductive layer over the magnetic layer, and a second magnetic layer over the conductive layer. Suitable masking and etching steps provide separate elements each having a conductor surrounded by a magnetic path terminating in a read/write gap. In the prior art, the individual elements are separated by cutting the substrate, finished, and then tested to determine if their electrical and magnetic characteristics are within predetermined acceptable standards. Failure of one element to meet the standards usually indicates that all other elements from the same batch will also fail to meet the standards because the defect occurred in the cutting or deposition, masking, etching, etc. In the prior art, early detection of defects has been attempted to prevent unnecessary processing of large numbers of unusable parts. Such testing includes visual inspection of surfaces, chemical analysis of samples, dimensional measurements, etc. However, the correlation between such tests and the electrical and magnetic characteristics of completed elements is poor.

SUMMARY OF THE INVENTION

During the manufacturing process, a magnetic layer is applied to the substrate in association with conductive layers. The conductive layers are masked or etched to form conductive areas for each head element as well as a "speical" conductor element. Electrical contacts are provided for selectively connecting one or more of the element conductors and the special conductor to a source of electrical signals and an amplifier. Electrical signals are applied to either the element conductor or the special conductor causing a magnetic field which intersects the other conductor. A signal caused by the field is amplified and compared to a predetermined signal value. If the comparison is within predefined values, the element conductor and underlying magnetic film is acceptable. The test may be repeated when the second film is deposited, or may be performed for the first time at that point in the process. In one embodiment of the invention, the additional conductor is a strip extending in a line past a plurality of the head elements, not functionally related to any completed head elements.

The foregoing and other features and advantages of the invention will be apparent from the following more particular description of preferred embodiments of the invention, as illustrated in the accompanying drawings.

DETAILED DESCRIPTION OF THE INVENTION

A transducer records information as magnetic areas on a medium by translating electrical signals into magnetic fields. The same transducer may also detect magnetic areas on a medium and translate them into electrical signals. Such transducers, commonly called magnetic read/write heads, usually operate by sensing the change in flux of a magnetic medium moving past the transducer. It is not essential that the medium move past the head, it being possible to move the head—the only requirement is that there be relative motion between the medium and the transducer to gain access to successive bits. A high bit density is considered to be 10,000 flux changes per inch (fci) and a high track density is considered to be between 500 and 2,000 tracks per inch at a high data rate of approximately 2.5 megahertz (MHz).

Magnetic Head Structure (FIGS. 1–3)

Figure 1A:
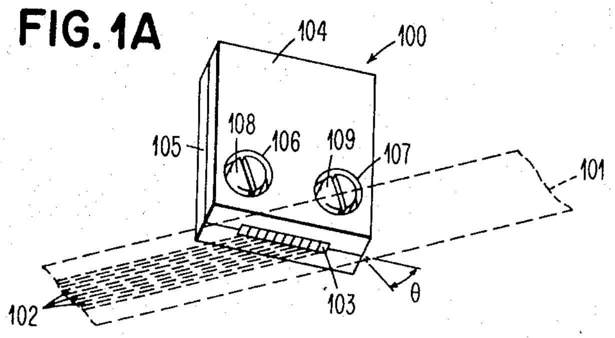
FIG. 1A shows a read/write head assembly for reading and writing information stored on a magnetic tape medium.

In order to obtain the desired high bit density, high track density and high data rate, it is desirable to operate the magnetic read/write head in a semitransverse mode. That is, the head is not necessarily mounted perpendicular to the relative motion between the head and the media. Referring first to FIG. 1A, there is shown a magnetic read/write head assembly 100 (for simplicity referred to as a magnetic head) mounted at an angle $\theta$ relative to a line across a magnetic tape 101. The magnetic head 100 is a transducer element 103 comprising a plurality of gaps each corresponding to a track 102 on the tape 101. As will be explained, the transducer element is a batch-fabricated thin film, foil strip or sheet, wherein each gap is defined by a slot, fastened between subassemblies 104 and 105 by fasteners 108 and 109 placed through fastening holes 106 and 107. As shown in more detail with reference to FIGS. 2A through 2E, the angle $\theta$ determines the number of tracks 102 which may be recorded on the magnetic tape 101 and the spacing and width of these tracks.

Figure 1B:
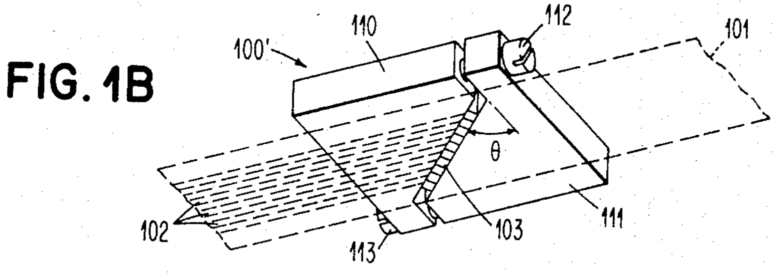
FIG. 1B shows another embodiment of a read/write head assembly for reading and writing information stored on a magnetic tape medium.
Figure 1C:
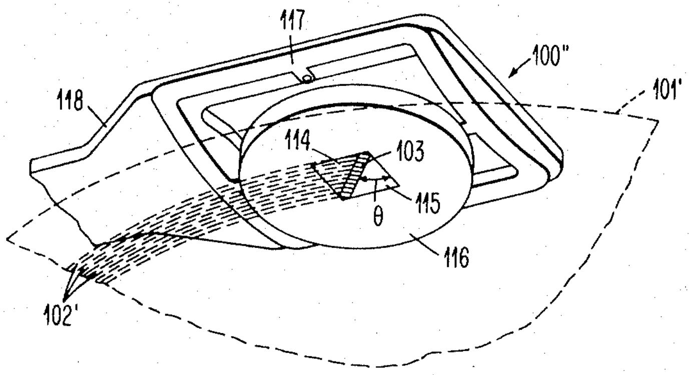
FIG. 1C shows a read/write head assembly for reading and writing information stored on a magnetic disk medium.

FIGS. 1B and 1C show two different embodiments 100′ and 100″ of the magnetic head 100 of FIG. 1A. Referring first to FIG. 1B, the magnetic head 100′ differs from the head 100 primarily in the subassemblies fastening the element 103 in position across the magnetic tape 101. The subassemblies 110 and 111 are held together by fasteners 112 and 113. The subassembly of FIG. 1B provides a surface with a lower profile than that of FIG. 1A. Referring now to FIG. 1C, a flying arm 118 supports the head 100″ to provide a floating structure capable of reading magnetic tracks 102′ on a rotating magnetic disk 101′. The element 103 is mounted at an angle $\theta$, relative to a line through the arm 118, in a mounting comprising sections 114 and 115 centered in a holder 116 which is loaded onto the arm 118 by the spring 117.

Figure 2B:
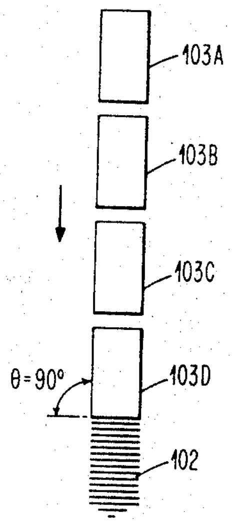
FIGS. 2A through 2E diagrammatically show the tracks on which information may be recorded by a read/write head positioned at varying angles relative to a medium.
Figure 2A:
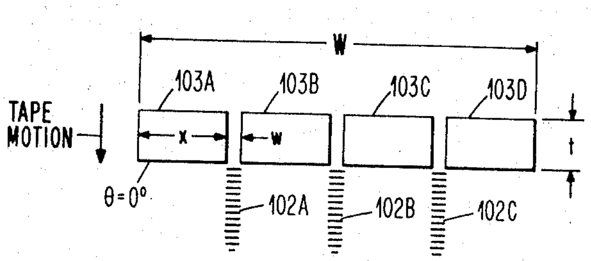
Figure 2C:
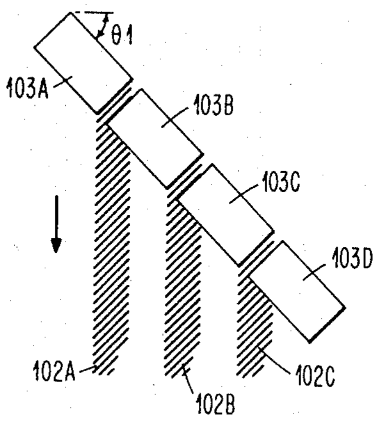
Figure 2D:
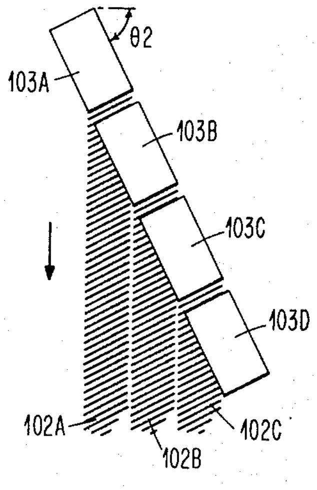
Figure 2E:
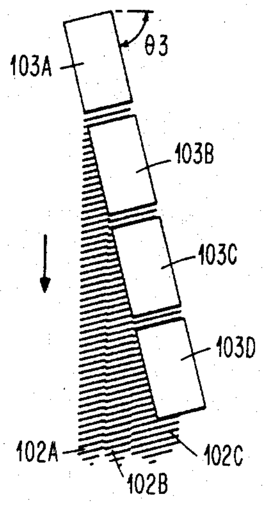

Referring now to FIGS. 2A through 2E, there are shown, in end views, details of the element 103 and the tracks 102 on the tape 101. The same details apply to tracks 102′ of disk 101′. The elements 103 having a thickness $t$ consist of a number $n$ of sections, illustratively, shown as 103A through 103D and the tracks corresponding thereto are numbered 102A through 102C. It should be noted that a magnetic track designation corresponds to a gap between two elements; for example, the gap having a width $w$ between element sections 103A and 103B results in track 102A. Referring first to FIG. 2A, there is shown the standard tape head-to-magnetic-track configuration wherein the head is mounted transverse ($\theta_0$=0°) to the magnetic tape or disk motion. The tracks 102A through 102C will have a width equal to the distance W between each of the head elements 103A through 103D (called "gap length" in the prior art) and a spacing equal to the cross-section $x$ of the elements 103A through 103D (called "gap width" in the prior art). Conventionally constructed prior art heads orient their gaps along axis 90° removed from the axis shown. Referring now to FIG. 2B, if the head element 103 is placed parallel to the track motion, ($\theta_{90}$=90°), the single track 102 will have a width equal to the thickness $t$ of the head element 103. (This is the gap orientation in a conventional head.) Referring to FIGS. 2C through 2E, a variety of head angles progressing from $\theta 1$ through $\theta 3$ is shown. It can be seen that as the angle increases from more than 0° toward less than 90°, the track width ($t \sin \theta$) increases and the total space between $n$ tracks ($W \cos \theta - n\, t \sin \theta$) decreases.

FIG. 2C shows a skew angle $\theta 1$ of approximately 45° where the track width and intertrack gap are approximately equal and the recorded track is slightly less than the gap width (thickness $t$ of the element 103). In FIG. 2D, the spacing between the tracks at $\theta 2$ is practically zero, and the track widths occupy almost the entire space upon the media available for recording and reading. If the skew angle is approximately 27.5°, the tracks become contiguous giving approximately 500 tracks per inch for an element thickness of approximately 0.002 inch and a center to center spacing of 0.004 inch. Referring to FIG. 2E, where the head angle is increased to $\theta 3$, the tracks 102A through 102C overlap.

In FIG. 2E, a skew angle of $\theta 3$=75° causes the tracks to overlap. Each of the tracks is approximately 0.001 inch wide and there are about 1,000 per inch. An increase in the skew angle can achieve up to 2,000 tracks per inch. It would be expected by one skilled in the art that if the recording gaps are displaced by 0.004 inch and the gaps are driven by high currents on the order of 1 ampere, adjacent tracks would be excited and crosstalk would occur. However, in testing the invention with alternate tracks driven at 500 and 1,000 flux changes per inch, respectively, with 1 ampere of write current it was observed that signals recorded on adjacent tracks were clearly defined and undisturbed.

Figure 3A:
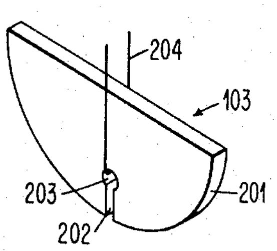
FIGS. 3A through 3C show various configurations of batch fabricated magnetic read/write head elements.
Figure 3B:
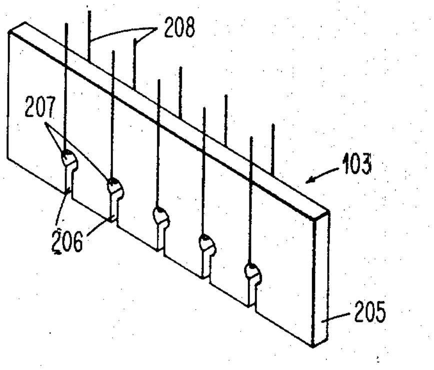
Figure 3C:
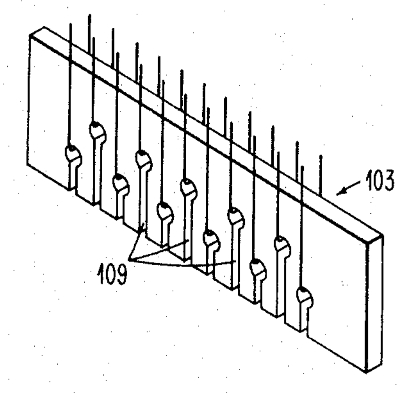

FIGS. 3A through 3C show a number of embodiments of batch fabricated elements 103 intended for mounting in transducers 100, 100′ and 100″ of FIGS. 1A–1C. Referring first to FIG. 3A, a single track foil or laminated head element is shown. The material 201 is a magnetic material such as HyMu 80, Mo Permalloy or equivalent, having a thickness ranging from 0.00025 inch to 0.002 inch. The head element includes an aperture 203 having a diameter on the order of 0.0025 inch and a gap running from the aperture to the edge of the material 201 having a gap width on the order of 0.0002 inch. A winding 204 passes through the aperture 203. While a single winding 204 is shown, it is possible to loop the winding 204 through the aperture 203 any number of times desired to give greater signal strength for both recording and reading.

The concept of FIG. 3A may be extended to a plurality of parallel tracks as shown in FIG. 3B. Each of the tracks has a corresponding aperture 207 and a slot forming a gap 206 in the material 205. Windings 208 pass through each of the apertures 207 in the manner previously described with reference to FIG. 3A. Similarly, FIG. 3C shows an alternative scheme permitting closer placement of gaps with limited structural weakening of the material by the apertures. Extension of this concept to thin film technology is also possible by placing conductive and magnetic elements on a substrate, as will be explained below with reference to FIG. 4.

In the case of transverse motion, as shown in FIG. 2A, while the tracks can be made very narrow (on the order of 0.00025 inch through 0.0005 inch wide), the track pitch is limited by the thickness of the wires 208 used to drive the elements 103. Thus, for wire 0.002 inch thick, the center to center spacing is limited to 0.004 inch and 250 tracks per inch. On the other hand, as shown in FIG. 2B, the track width may be limited only by the element thickness, that is 0.001 inch through 0.002 inch, to give 500 to 1,000 tracks per inch. However, this creates the problem that all the tracks are powered in the same plane and each succeeding track therefore erases the data recorded by the preceding track. Thus, one of the positions shown in FIGS. 2C–2E will be preferable.

Figure 4:
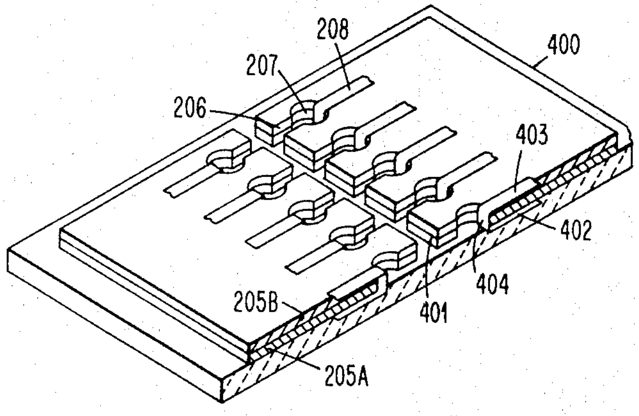
FIG. 4 is a detailed view showing construction of one embodiment of FIG. 3B.
Figures 5A, 5B:
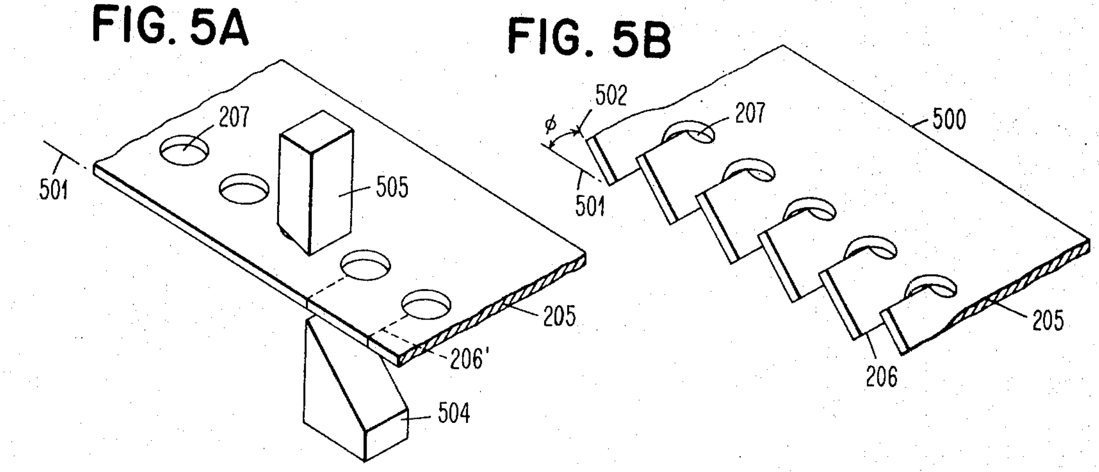
FIGS. 5A through 5C show several techniques for forming gaps in magnetic read/write head elements of the type shown in FIG. 3B.
Figure 5C:
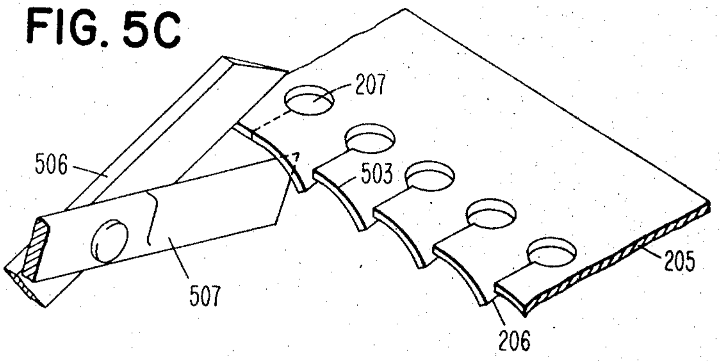
Figure 6:
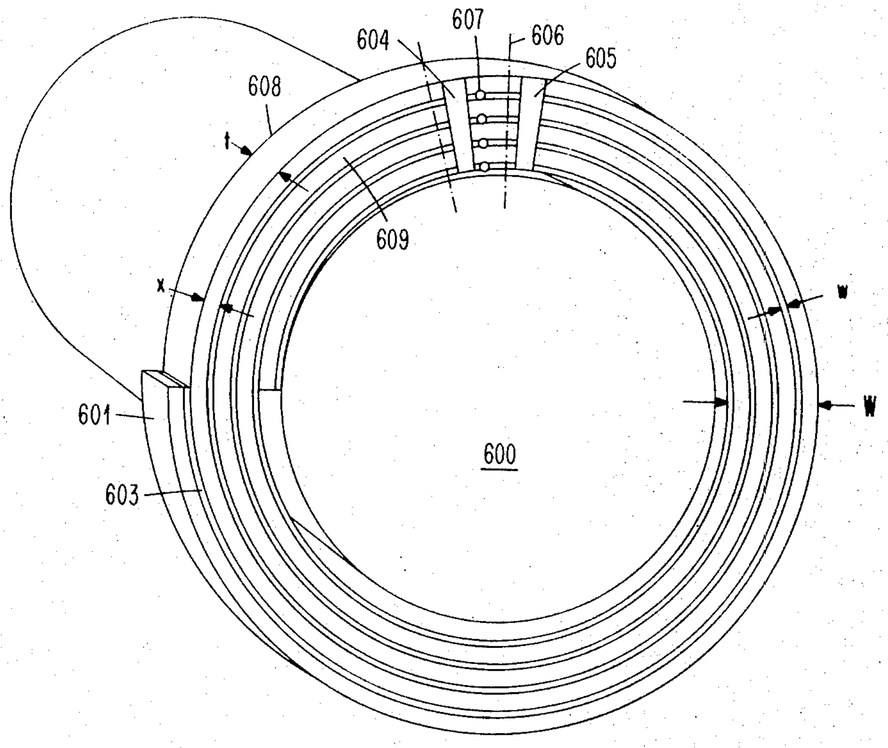
FIG. 6 shows an alternative technique for manufacturing the magnetic read/write head element of FIG. 3B.

Manufacturing Methods (FIGS. 4–6)

Magnetic head elements referred to in FIGS. 1–3 are manufactured by a number of techniques including thin film evaporation, lamination, shearing, etc. Referring to FIG. 4, thin film deposition or foil bonding techniques can form head elements of the type shown in FIG. 3B. A substrate 400 comprising an insulating material such as glass carries an insulating layer 205A and a magnetic material 205B. A winding 208 passes through apertures 207 and gaps are formed by slots 206 extending from the aperture 207 to the front surface 401 of the head element. The winding 208 is formed in three sections including a bottom section 402, a top section 403 and a center section passing through the aperture 207. The normal thin film construction steps include evaporation of the conductor 402 on the substrate 400 followed by evaporation of the insulating and magnetic layers in order. The apertures and the slots may then be etched and the conductor 404 and 403 added by appropriate masking, evaporation and etching steps. There is interposed a variety of spraying, oxidizing and glassing steps well known in the art. Prior to utilization of the head element, it is removed by shearing along a line through front surface 401. An alternative technique for manufacturing the head of FIG. 4 uses a laminated foil material, comprising insulator 205A and magnetic material 205B, and etching and deposition steps otherwise similar to those previously described.

Referring now to FIGS. 5A and 5B, an alternative technique for forming the slots 206 will be explained. The material used to form the heads may be the magnetic material 205B shown in FIG. 4 or it may comprise a sandwich 205 including an insulator and a magnetic material. In either case, the material is covered with a masking resist. The first step in the manufacture of the slots is to define a line, from the aperture 207 to the edge 501 of the material 205, along which the slots will be formed. A punch 504 and die 505 are mated along each of the lines 206' to form the gaps 206 as shown in FIG. 5B. The successive die and punch operations skew lines 502 relative to the base line 501 at an angle $\phi$. A single punch 504 and die 505 may be used or a plurality of punches and dies may be simultaneously applied to the material 205. In each case, the surface 501 will be broken up into successive segments having an angle $\phi$ relative to the original base line 501. The material 205 is then etched to increase the ultimate slot size and smooth the slot edges. Next, the resist covering the material 205 is stripped from the part. The part 205 is then flattened, annealed and the surface is, if desired, oxidized. The end result is a stress free head element having a gap 206 which is evenly formed.

Referring now to FIG. 5C, a technique similar to the one described with reference to FIGS. 5A and 5B utilizes a scissoring action of opposed blades 506 and 507. The effect is to form a curved surface 503 as opposed to the flat surface in the technique of FIGS. 5A and 5B. The subsequent steps however, are identical to those previously described.

Alternative techniques for forming gaps and other dimensions exist. For example, a line may be scratched from the aperture to the edge and the slot etched, cut, sawed, laser, or electro-discharge machined or electron beam machined, etc. Since the material is originally covered with a resist, the etchant attacks only the scratched area. The apertures may be formed similarly or by countersinking the surface and etching or by punching the holes entirely.

Referring now to FIG. 6, still another technique for manufacturing a head element of the type shown in FIG. 3B is shown. An annealed or unannealed flat magnetic foil strip or wire 601 such as HyMu 80 or its equivalent having a thickness $t$ and cross-section $x$ is plated by evaporation or some other appropriate technique with a gap material 603, such as copper, to a width $w$. It is possible to plate a width of one-half $w$ on each side of the strip 601, though the strip is shown plated on only one side. The plated strip 601 is coiled about a mandrel 600 having a diameter $d$ which is much larger than the wire cross-section $x$. The wound strip may then be annealed, for example at approximately 1,200° F., until light diffusion bonding occurs at the interface between materials 601 and 603. The face 609 of the wound strip is then appropriately masked off to permit the plating of additional magnetic material 604, 605, etc.; for example, permalloy, at successive points around the wound strip. Holes 607 are then drilled, punched, or otherwise formed by techniques known in the art (such as the use of laser beams) and the outside face is potted to permit removal of the mandrel. A wire saw or laser may then be used to cut the successive sections along lines 606, etc., from the wound strip, and the back 608 is lapped to produce the required track width. The manufacturing technique produces a magnetic head having gaps $w$ wide, with a pitch between the gaps of $x + w$ and a track width of $t$ or less.

TESTING TECHNIQUES — FIGS. 7–8

Figure 7A:
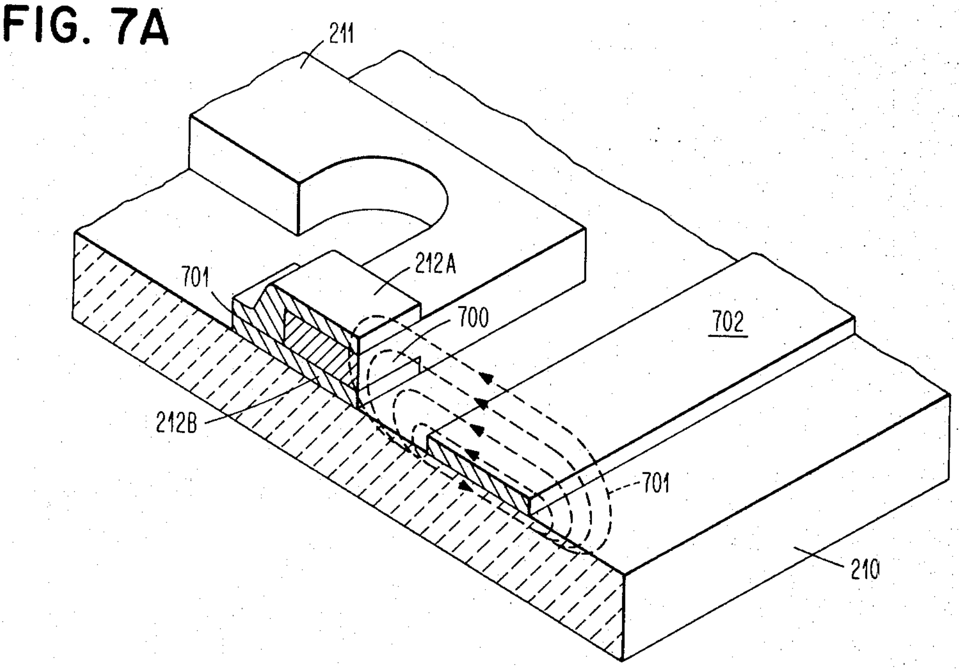
FIG. 7A shows the positioning of a magnetic read/write head element for the purpose of testing it during manufacture.

Referring first to FIG. 7A, there is shown an illustrative horseshoe single turn magnetic head which may be tested during the manufacturing process and before final assembly. While shown for a thin film head element, to illustrate its broad applicability, the testing technique applies equally to the head elements of FIGS. 3A through 3C and particularly FIG. 4.

Figure 7B:
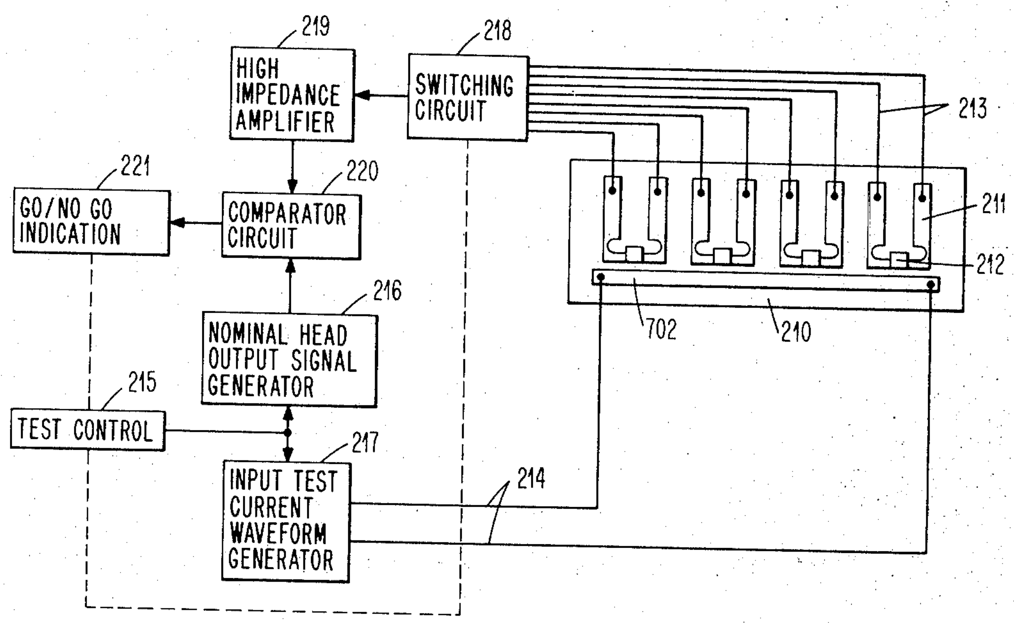
FIG. 7B is a systems diagram showing means for testing the head element of FIG. 7A.

A single turn magnetic head is formed on substrate 210 using conventional prior art techniques. The head comprises a conductor 211 and a horseshoe of magnetic material 212A and 212B forming a front gap 700 and back gap 701. A plurality of head elements are placed on substrate 210 together with a strip of conductive material 702 which is used for testing all of the head elements to determine early in the manufacture if there are any defects in the head elements. For testing purposes, the strip 702 should be in close proximity to the front gap 700 as illustratively shown in FIG. 7A. In practice, an extension of the head element normally occupies the space between the head element and the strip. This extension may be removed before testing to expose the front gap, as shown, or as a final step in the manufacture. Referring to FIG. 7B, a plurality of head elements 211 on a substrate 210 is associated with the conductor strip 702 which is connected to an input test current waveform generator 217. The head elements 211 are connected via wires 213 to a switching circuit 218 which connects each of the head elements 211 in turn to a high impedance amplifier 219. If desired, all of the head elements 211 may be simultaneously connected to separate high impedance amplifiers to eliminate the need for the switching circuit 218. When a known electrical current is supplied on wires 214 to the strip 702, a magnetic field will surround the strip 702 causing a current to be induced in each of the head elements 211. This causes a current to flow in the wires 213 which current can then be compared with the original known current to determine if the head elements 211 are within desired tolerances. It will be understood that a similar effect may be achieved by supplying current on wires 213 and monitoring the result on wires 214. In operation, the known current is supplied by a nominal head output signal generator 216 which provides a standard test signal to the input test current waveform generator 217 and to a comparator circuit 220. The input test current waveform generator 217 supplies a signal to the test strip 702 and the comparator circuit 220 receives the resulting signal from the head element 211 by way of the switching circuit 218 and the high impedance amplifier 219. A go-no-go indication is generated by a circuit 221 connected to the comparator circuit 220. For example, if the signal received by the high impedance amplifier 219 is within a given tolerance of the nominal head output signal from the generator 216, the circuit 221 may indicate that all the heads on the substrate 210 are satisfactory. Control of successive tests is performed by a test control 215 which causes a separate input test current waveform to be generated by the circuit 217 for each of the successive heads 211 tested by the switching circuit 218. The successive tests are accumulated under control of the test control 215.

Figure 8A:
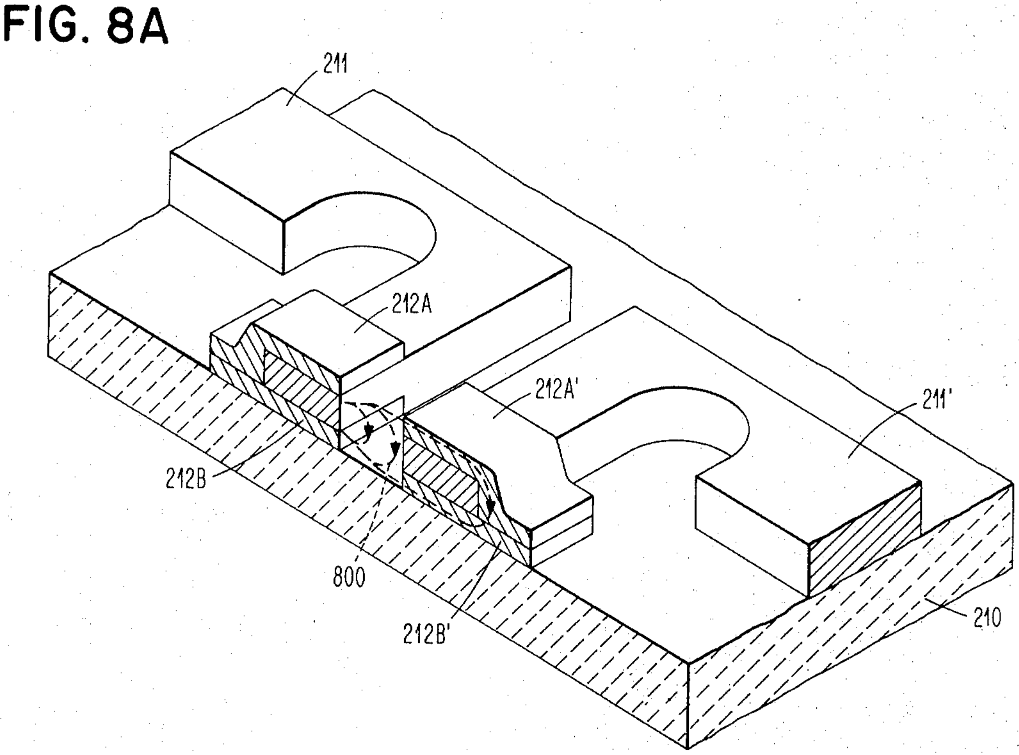
FIGS. 8A and 8B show an alternative scheme for testing magnetic read/write head elements.
Figure 8B:
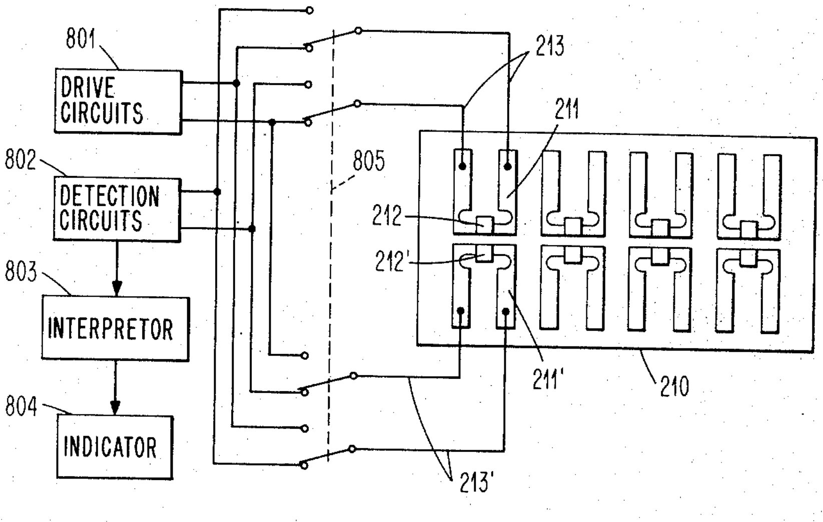

Referring now to FIGS. 8A and 8B, an alternative embodiment for testing heads is shown. The strip 702 utilized for the tests of FIG. 7A may be eliminated by forming the head elements in complementary rows on the substrate 210. Alternate rows of head elements are oriented in such a way that the gap area of heads in the two rows are in close proximity, for example, less than 1 mil spacing. The conductors 211 and 211′ are associated with magnetic material 212A and 212B and 212A′ and 212B′ on the substrate 210. The structures may be deposited with separation between the elements of the two rows achieved by depositing the elements up to a line of photoresist, for example. Alternatively, the structure may be deposited with the two rows combined and then later separated by cutting or by etching. In either case, the current is applied to one row of the heads and magnetic field 800 will induce a current to flow in another row of heads. This is shown in more detail in FIG. 8B where two rows of heads are mounted on a substrate 210 and switches (not shown) connect pairs of head elements to drive circuits and detection circuits. If desired, this switch may be eliminated by connecting each complementary pair of head elements to separate drive and detection circuits. Each head element 211 and 211′ is connected to circuits 801 and 803 in turn by switch 805. In operation, the drive circuit 801 provides a signal to the head element 211 causing a current to flow therein which causes a magnetic field to induce an electric current in the complementary head element 211′ which current is carried by wires 213′ to the detection circuit 802. Interpreter 803 recognizes whether the detected signal is within accepted tolerances and an indicator 804 accumulates successive tests to indicate whether all of the head elements on the substrate 210 are within accepted tolerances. It will be evident to one skilled in the art that all of the head elements in one row may be driven simultaneously and all of the head elements in the other row may be monitored simultaneously, or all of the elements in one row may be driven simultaneously and one element at a time in another row may be monitored. Also, it is possible to exchange the circuits of FIG. 7B and FIG. 8B to provide similar interpretive data. It is not necessary that the head elements tested be accumulative though it is desirable to determine whether all of the head elements on a given substrate are satisfactory. It is, however, possible to utilize information indicating which of the head elements are not satisfactory so that subsequent manufacturing operations may remove the unsatisfactory elements, replace them, or utilize the substrate in such a manner as to ignore sections containing unsatisfactory elements. A variety of tests may be performed in addition to the ones described, for example, the output as a function of the driving frequency, output as a function of driving current, the shape of the output current along the easy-hard access, secondary shorts, inductance of the primary, crosstalk tests, etc. The same tests may also be applied to other types of heads previously described.

While the invention has been particularly shown and described with reference to preferred embodiments thereof, it will be understood by those skilled in the art that various changes in form and details may be made therein without departing from the spirit and scope of the invention.

What is claimed is:

1. A combination for testing a plurality of magnetic head elements, carried on a substrate, during manufacture and before final separation and processing, including:

conductive means carried on said substrate;

a signal source, connectable to the conductive means, for causing said conductive means to supply a magnetic field to intersect head elements associated with the conductive means;

a signal monitor, connectable to each of said head elements, to sense as electric current the magnetic field intersecting the connected head element;

interpretive means, associated with said signal monitor for comparing the electric current sensed by the signal monitor to an acceptable current; and indicating means, connected to said interpretive means for indicating when the comparison indicates that the monitored electric current bears a predetermined relationship to the acceptable current.

2. The combination of claim 1 wherein the conductive means are a number of electrically conductive strips carried on said substrate each separate from, and in close proximity to, a number of head elements associated with said strips.

3. In combination, apparatus for testing during manufacture magnetic read/write recording elements, formed in batches on a substrate, including:

a source of electrical test signals;

conductive means, on said substrate, connected to said source and operable by said electrical signals, for generating a magnetic field intersecting a plurality of said elements;

monitoring apparatus, connected to a selected number of said plurality of elements intersected by said magnetic field, for receiving electrical signals generated by said magnetic field; and sensing apparatus, connected to said monitoring apparatus, for detecting and indicating when the electrical signals received by said monitoring apparatus varies relative to predetermined tolerances.

4. The testing apparatus of claim 3 wherein the conductive means comprise material, additional to the recording elements, formed on the substrate by the same techniques as are the elements.

5. The testing apparatus of claim 4 wherein the conductive means further comprise a number of elongated strips each adjacent to a plurality of elements.

6. The method for testing, during manufacture, batch-fabricated head elements formed of a magnetic material on discrete areas of a surface, including the steps of:

subjecting a selected number of the elements to a magnetic field of known characteristics generated by means also formed on the surface;

monitoring electric currents on selected ones of the elements subjected to the field;

comparing the monitored electric currents to predetermined values related to the known field characteristics; and distinguishing, as a result of said comparison, elements having a current indicative of satisfactory performance from those which do not.

7. The method of claim 6 wherein the magnetic field is electrically generated.

8. The method of claim 7 wherein the field is generated from conductive material placed on the surface, in the vicinity of the magnetic material at the same time as conductive portions of the head.

9. A combination for testing a plurality of magnetic head element areas carried on a substrate, during manufacture and before final separation and processing, including:

a conductive strip, carried on said substrate, in the vicinity of a number of head element areas;

an input test signal source, connectable to the conductive strip, operable to cause said conductive strip to supply a varying magnetic field to intersect said number of head element areas;

a signal monitor, operable when connected to one of said number of head element areas, to sense as electric current the magnetic field intersecting the connected head element area;

means for connecting the signal monitor to each of the number of head element areas in turn;

a nominal signal source, for supplying nominal reference signals;

a comparator, associated with said signal monitor and nominal signal source, for comparing the electric current sensed by the signal monitor to the nominal reference signals; and indicating means, connected to the comparator for indicating when the comparison indicates that the monitored electric current bears a predetermined relationship to the nominal signals.

10. In combination:

a first set of batch-fabricated magnetic head elements and a second set of associated conductive means in close proximity on a manufacturing base;

a source of electrical signals connected to a selected one of said sets operable to generate a magnetic field for intersecting the other set; and signal monitoring apparatus connected to the other of said sets for monitoring magnetic fields intersecting said set.

* * * * *